US010382914B2

(12) United States Patent
Fu et al.

(10) Patent No.: US 10,382,914 B2
(45) Date of Patent: Aug. 13, 2019

(54) TECHNIQUES TO LEVERAGE DATA FROM MOBILE HEADERS

(71) Applicant: Facebook, Inc., Menlo Park, CA (US)

(72) Inventors: Anthony Fu, Cupertino, CA (US); Denise Moreno, San Jose, CA (US); Xiao Liang, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 380 days.

(21) Appl. No.: 14/061,696

(22) Filed: Oct. 23, 2013

(65) Prior Publication Data

US 2015/0113381 A1 Apr. 23, 2015

(51) Int. Cl.
*G06F 17/20* (2006.01)
*H04W 4/18* (2009.01)

(52) U.S. Cl.
CPC .................................... *H04W 4/18* (2013.01)

(58) Field of Classification Search
CPC .... G06F 17/2247; G06F 17/24; G06F 17/211; H04W 4/18
USPC .......................................................... 715/234
See application file for complete search history.

(56) References Cited

U.S. PATENT DOCUMENTS

2002/0103712 A1* 8/2002 Rollins .................. G06Q 20/02 705/26.8
2003/0149583 A1* 8/2003 Ergezinger ......... G06Q 20/4012 370/352
2004/0167987 A1* 8/2004 Reese ..................... G06F 9/465 709/238
2005/0125453 A1* 6/2005 Rozack ............. H04L 29/06027
2006/0075110 A1* 4/2006 Seraphin ................. H04L 63/08 709/227
2006/0129905 A1* 6/2006 Spork .................. G06F 17/241 715/221
2008/0132215 A1* 6/2008 Soderstrom ......... H04L 12/1818 455/416
2008/0134052 A1* 6/2008 Davis ..................... G06Q 10/10 715/744
2011/0111737 A1* 5/2011 Abbott .................... H04L 51/32 455/414.1
2014/0067930 A1* 3/2014 Berdichevsky ......... H04W 4/06 709/204
2014/0169271 A1* 6/2014 Awano .................... H04W 8/12 370/328

FOREIGN PATENT DOCUMENTS

WO WO 2009130389 A1 * 10/2009 ....... H04L 29/12207
WO WO-2009130389 A1 * 10/2009 ....... H04L 29/12207

* cited by examiner

*Primary Examiner* — Shahid K Khan

(57) ABSTRACT

Techniques to leverage data from mobile headers are described. In one embodiment, for example, an apparatus may comprise a network component, a data component, and a web component. The network component may be operative to receive a request for a web page from a phone, the request transmitted using one or more network packets, and to transmit the web page to the phone. The data component may be operative to extract a phone number from a header of the one or more network packets. The web component may be operative to customize the web page based on the extracted phone number. Other embodiments are described and claimed.

17 Claims, 13 Drawing Sheets

1300

TECHNIQUES TO LEVERAGE DATA FROM MOBILE HEADERS

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to leverage data from mobile headers. Some embodiments are particularly directed to techniques to extract a telecommunications-carrier implanted phone number from a mobile header sent as part of a request for a web page and leverage that phone number to customize the web page. In one embodiment, for example, an apparatus may comprise a network component, a data component, and a web component. The network component may be operative to receive a request for a web page from a phone, the request transmitted using one or more network packets, and to transmit the web page to the phone. The data component may be operative to extract a phone number from a header of the one or more network packets. The web component may be operative to customize the web page based on the extracted phone number. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
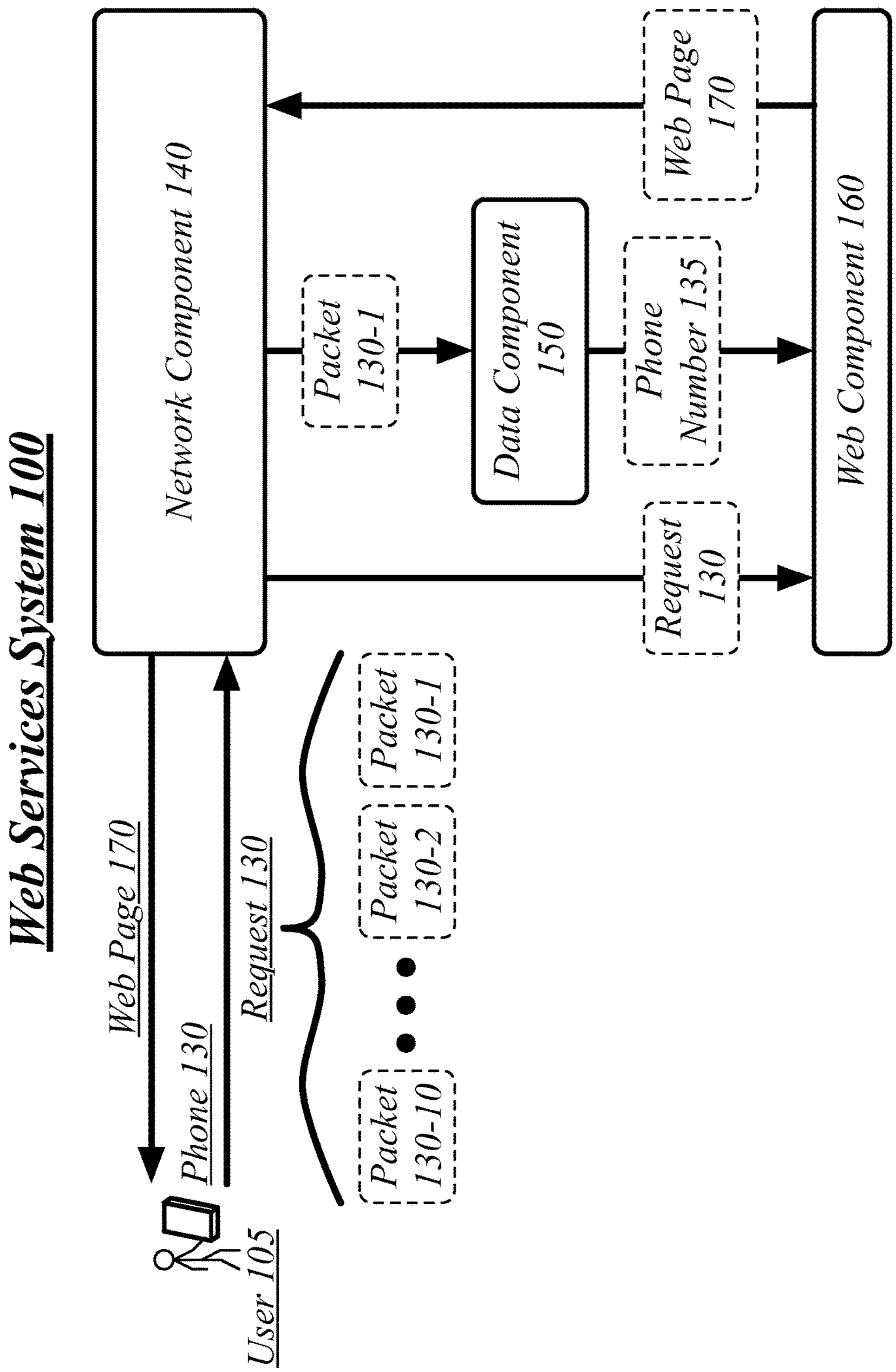
FIG. 1 illustrates an embodiment of a system to leverage data from mobile headers.

Various embodiments are directed to techniques to leverage data from mobile headers. Web-based services may be accessed over the Internet via various devices: personal computers (PCs), tablets, smart phones, mobile phones, portable digital assistants (PDAs), smart devices, or any other type of computing device. Various web-based services may be customized to individual users. This customization may be based on the individual real-world identity of a user and may be based on a user account for a user with the web service. For example, a person may use a mobile phone to access a web site and may access that web site in association with a user account specific to them. If that web site is a social networking service, the user may be presented with content specific to their account on the social networking service: news updates related to friends, lists of friends currently available for online chat, event information relevant to their life on the social network, messages received from friends and others on the social networking service, etc.

Accessing an existing user account may involve the use of two pieces of information: an identifier that uniquely identifies the user and a secret password the knowledge of which verifies the user as being associated with the account. The unique identifier, unlike the password, may not be secret, and may be publicly known or may be acceptable for sharing between friends. The identifier may comprise a unique name for the user account, a telephone number, an email address, or any other identifier unique within a particular namespace—user account names for the service, a particular country's telephone network, and the unique pair of a particular email account at a particular domain name, respectively. In some cases, a user may have multiple unique identifiers associated with their account—a unique account name, a unique email address, and a unique phone number—with any of them being available to the user for identifying themselves and logging into their account. As the identifier may be publicly known or appropriate for public knowledge, a user may be aided in logging into a web service by having the identifier, or one of the acceptable identifiers, prefilled into a login form for them by the web service. For example, a cookie stored on a user device may contain the identifier and may be used by the web service to prefill the "login" or "identifier" entry in a login form.

However, some devices may not support cookies, some users may choose not to use cookies, the bandwidth used to transmit a cookie may be undesirable, or for any other reason a cookie may not be used. As such, the web service may be aided by receiving information as part of a request to access the web service that allows them to identify the user, allowing the web service to in turn aid the user by prefilling the login form. Where a phone, such as a mobile phone, is used to access the web service, the phone number associated with and used by the phone may serve as the unique identifier. A mobile phone may comprise a smart phone, a feature phone, or any other known form of phone capable of accessing the web. The web browser on the phone, however, whether first-party or third-party, may not be arranged to automatically include the phone number for the phone as part of a request to access the web service. As such, the telecommunications carrier may instead be used to transmit the phone number to the web service, such as by placing the phone number in a header of at least one of the network packets used to transmit the request from the phone to the web service. Because of the additional processing and bandwidth involved in modifying headers and including the phone number, the telecommunications carrier may only include the phone number in the packet header when the packet is addressed to and for delivery to a destination internet protocol (IP) address specifically flagged or otherwise listed as requesting and being configured and authorized to receive a source phone number embedded in a header.

Further, the use of embedded phone numbers has uses beyond identifying existing user accounts. A user without an existing account may still be identified and receive a response to their request for access to a web service that is customized based on the received phone number. For example, if the phone number can be associated with a known individual in a targeted advertising system, targeted advertisements from the system may be generated targeted based upon the identification of the individual. If the user was sent an invitation to create an account on the web service, any information gained about the user may be used to prefill a registration form for the creation of an account. If the phone number can be associated with an individual about which the web service has information, the information can be used to create an experience that approximates the fuller experience of those with real user accounts. It will be appreciated that any customization of a web page, web service, or web experience that leverages knowledge about an individual may be aided by learning an identifier for the individual such as a phone number. As a result, the embodiments can improve both the ability of a web service to exploit knowledge about an individual and a user's experience with a web service.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a web services system 100. In one embodiment, the web services system 100 may comprise a computer-implemented web services system 100 comprising one or more components. Although the web services system 100 shown in FIG. 1 has a limited number of elements in a certain topology, it may be appreciated that the web services system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=10, then a complete set of packets 130-*a* may include components 130-1, 130-2, 130-3, 130-4, 130-5, 130-6, 130-7, 130-8, 130-9, and 130-10. The embodiments are not limited in this context and it will be appreciated that in various embodiments different values of a and other designators may be used.

The web services system 100 may be generally operative to interact with a phone 110 belonging to or otherwise being used by a user 105. The web services system 100 may receive a request 120 related to a web service run by the web services system 100 and may respond to the request 120 with a web page 170 customized according to a phone number embedded in one of the packets 130-*a* used to transmit the request 120 from the phone 110 to the web services system 100. The web services system 100 may comprise a network component 130, a data component 150, and a web component 160.

The network component 140 may be operative to receive a request 120 for a web page 170 from a phone 110, the request 120 transmitted using one or more network packets 130-*a*. The network component 140 may be operative to transmit the web page 170 to the phone 110 after it has been customized by the web component 160. The phone 110 may comprise a mobile phone used by a user 105, owned by a user 105, or otherwise associated with a user 105. The request 120 may comprise an hypertext markup language (HTML) request for the web page 170 transmitted using the hypertext transport protocol (HTTP), hypertext transport protocol secure (HTTPS), or any other technique for the transmission of requests for a web page. Similarly, the web page 170 may comprise an HTML page or any other form of web page, and may be transmitted from the network component 140 to the phone 110 using HTTP, HTTPS, or any other technique for the transmission of a web page.

The data component 150 may be operative to receive one or more of the one or more network packets 130-*a*. For instance, the data component 150 may receive network packet 130-1. It will be appreciated that in various embodiments any one of the received network packets 130-*a* may be transmitted to the data component 150 by the network component 140. The received network packet 130-1 may be analyzed by the data component 150 to determine if a phone number is embedded in a header for the packet 130-1. The header for a packet 130-1 may generally comprise a string of bytes, text, or other encoded data, such as a list of information delineated by one or more special characters or byte-codes. The network packet 130-1 may be analyzed to determine if a particular string, byte-code, sequence of bytes, or other predetermined sequence of data is contained within the header of packet 130-1, wherein the predetermined sequence of data indicates that a particular delineated portion of the header contains a phone number. If this identifier for a delineated phone number is found, the phone number may be extracted and forwarded to the web component 160. If this identifier is not found and therefore determined to be absent, the web component 160 may be explicitly notified that no phone number was embedded in the header or, alternatively, the web component 160 not receiving a notification about the presence of a phone number may serve as an implicit indication to the web component 160 not to rely on a phone number for the customization of the web page 170.

The web component 160 may be operative to receive the request 120 and the phone number 115 and to customize the web page 170 based on the extracted phone number 115. As the request 120 may be an HTML request for a web page, the request 120 may be used to determine a general web page for transmission to the user 105. For instance, the request 120 may be for the entry page for a web service. The entry page may be customized in various ways depending on what information is known and confirmed about the user 105 requesting it. If nothing is known about the user 105, the user 105 may be presented with a dual login-and-registration page which contains fields allowing for a user 105 to login to an existing user account and which contains additional fields allowing for a user 105 to register a new account. If the user 105 is known or suspected to be a user with an existing account, a login-specific page may be presented to the user 105 and may be prefilled with information to aid the user 105 with logging in. If the user 105 is known or suspected to be a user without an existing account a registration-specific page may be presented to the user 105 and may be prefilled with any information known about the user 105 relevant to account registration. Alternatively or additionally, prefilled login information and prefilled registration information may be used on a dual login-and-registration page where either or both of a login portion of the page and registration portion of the page are prefilled according to known information. Further, a user 105 that is known to be associated with a specific user account to an adequate degree of accuracy may be shown a content page with content for that user account, bypassing login and registration.

Figure 2:
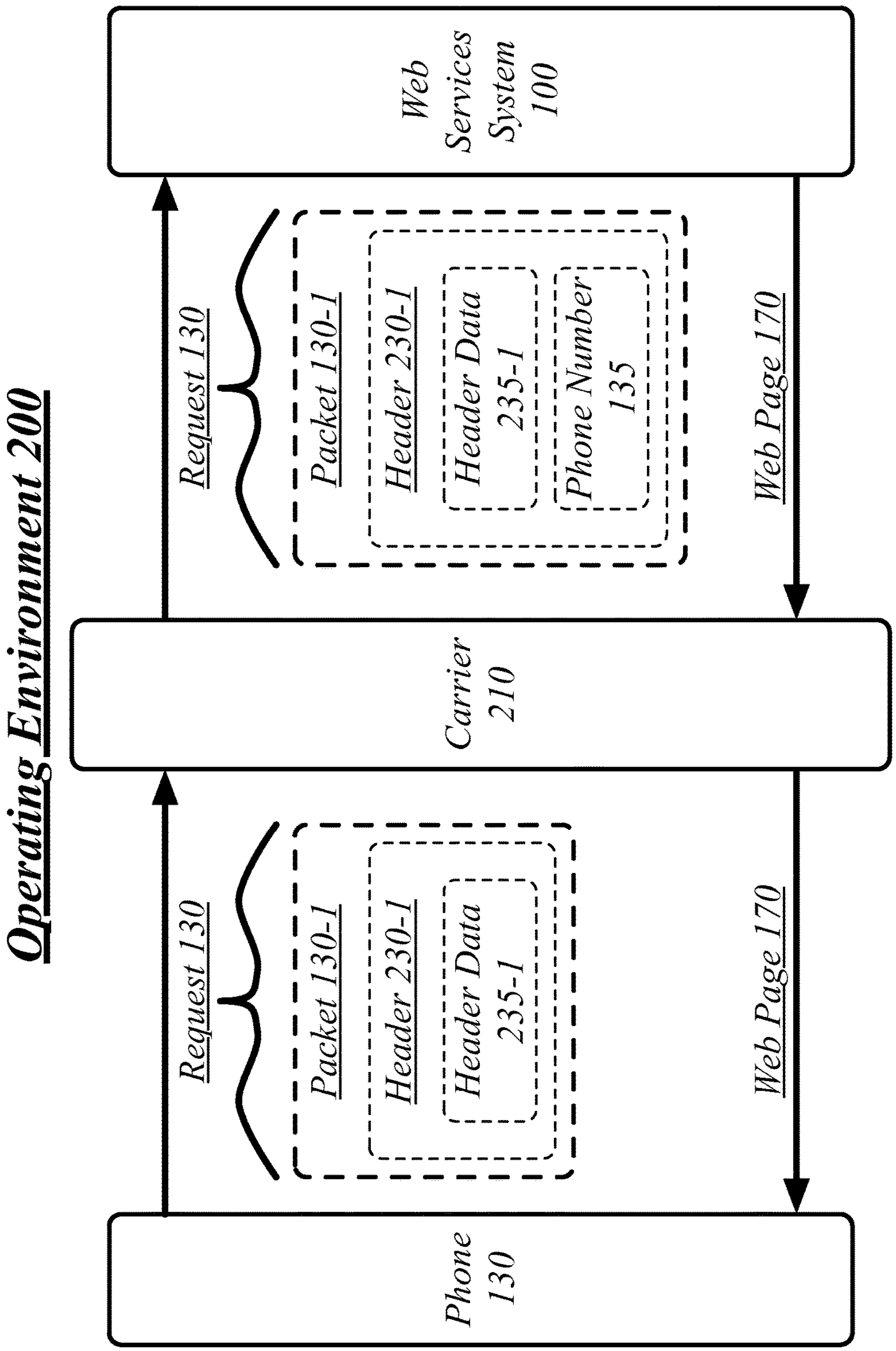
FIG. 2 illustrates an embodiment of an operating environment for the web services system.

FIG. 2 illustrates an embodiment of an operational environment 200 for the web services system 100. As shown in FIG. 2, the communication between the phone 110 and the web services system 100 is transmitted via a carrier 210.

A mobile phone, such as phone 110, may access the Internet using a telecommunications carrier 210. The telecommunications carrier 210 may be specific to where the mobile phone 110 accesses the Internet using a data portion of a cellular network. As such, in some embodiments, the telecommunications carrier 210 may only be involved where the phone 110 is using a cellular network for data communication instead of, for example, a Wi-Fi network.

The telecommunications carrier 210 may be operative to receive a request 120 for a web page 170 from a phone 110 and to carry out at least a portion of the transmission of the request 120 to the web services system 100. In some embodiments, the carrier 210 may receive the request 120 from the phone 110 at a cell site and transmit the request 120 forward to a bridge into the general Internet, with the Internet carrying the request 120 the remainder of the distance to the web services system 100. Similarly, the web page 170 may be initially transmitted via the general Internet to the carrier 210 and then carried the remainder of the way to the phone 110 by the carrier 210.

The request 120 may comprise packets 130-*a* including packet 130-1. In some embodiments, the same set of packets may be used to transmit request 120 from the phone 110 to the carrier 210, within the telecommunications system of carrier 210, and across the Internet to web services system 100. However, in some embodiments, carrier 210 may re-divide the request 120 into a different set of packets upon receiving the request 120 from the phone 110 for transmission internal to its telecommunications system and may re-divide the request 120 into a different set of packets when transmitting the request 120 out into the general Internet. Similarly, one or more carriers within the general Internet may modify how request 120 is divided between packets.

The telecommunications carrier 210 may be operative to insert the phone number 115 into the header 230-1 of a packet 130-1 which comprises at least a portion of request 120. The carrier 210 may ensure that the phone number 115 is inserted into the header or is retained from a previous insertion into the header as packets 130-*a* are transmitted into the general Internet and therefore out of the control of the telecommunication carrier 210. In some embodiments, the carrier 210 may insert the phone number into every packet of packets 130-*a* for request 120 and in others may only insert the phone number into a specific one of the packets 130-*a* such as the first packet 130-1.

The header 230-1 for packet 130-1 may already contained header data 235-1 when it is received by the carrier 210. The carrier may be operative to prepend, append, or otherwise insert the phone number into the header 230-1 so that modified header 230-1 contains both the original header 235-1 and the phone number 115. The telecommunications carrier 210 may also insert additional data into the header 230-1 as it may use for other purposes such as routing, authentication, etc.

The carrier 210 may be operative to only insert phone numbers into the headers of packets with a destination IP address that matches a list of flagged IP addresses. The carrier 210 may be operative to only insert phone numbers in the headers of packets with a destination domain that matches a list of flagged domains. In different embodiments flagged domains may consists of different depths of domain-name specification, such as "facebook.com" and "h.facebook.com". As such, the phone number 115 may have been inserted into the header 230-1 in response to and based on a determination that the destination IP address or destination domain matches a list of flagged IP addresses or flagged domains. In general, the request 120 may be transmitted to a particular destination address, such that the phone number 115 is inserted in the header by the telecommunications carrier in response to a determination by the telecommunications carrier that the destination address matches a list of flagged addresses, wherein the address may comprise any of an IP address, a domain name address, or any other known form of specifying a destination on the Internet.

The carrier 210 may additionally or alternatively only insert the phone number 115 into packets that contain at least a portion of a request 120 of a particular type. For instance, phone numbers may only be inserted for requests of a specific format, such as HTML. Phone numbers may only be inserted for requests of a specific protocol, such as HTTP or HTTPS. Phone numbers may, more generally, only be inserted for requests that are a request for a web page. The carrier 210 may perform a deep packet inspection of the packets comprising a request 120 to determine whether the request 120 is of a particular type—barring this deep packet inspection, the carrier 210 may have no knowledge of the nature of a communication carried in the packets transmitted through it. Deep packet inspection may reveal further details, such as the requested URL in an HTTP or HTTPS request for a web page, and may only insert phone numbers into packets for requests containing a request for a URL on a list of flagged URLs. For example, phone numbers may only be inserted into those packets comprising a request for the entry page of a web services system 100. As deep packet inspection may be more computationally expensive than simply forwarding the packets 130-*a*, only those packets with a destination IP address or domain on the list of flagged IP addresses or domains may be subject to deep packet inspection to determine whether a phone number should be inserted.

Figure 3:
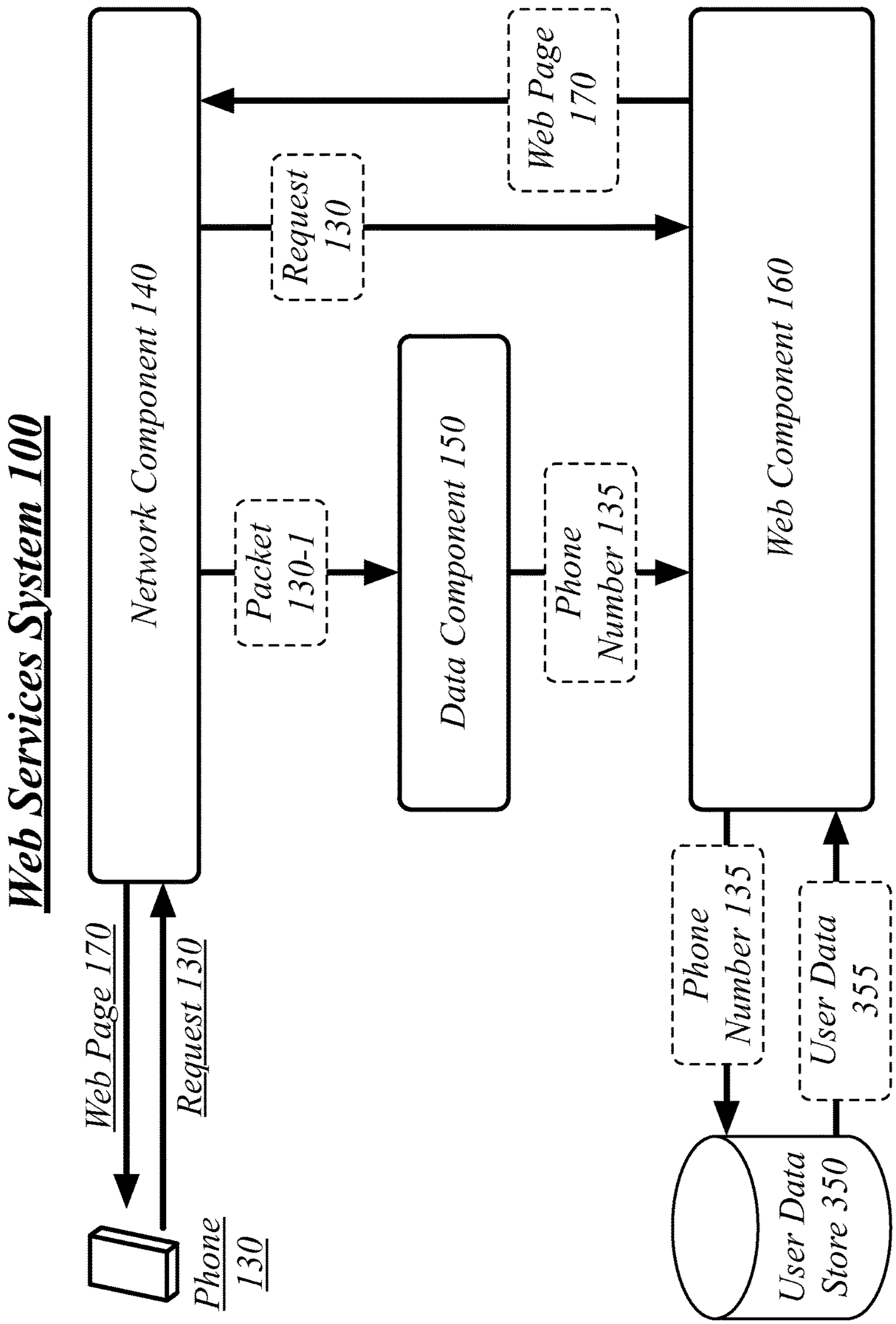
FIG. 3 illustrates a second embodiment of the system to leverage data from mobile headers including a user data store.

FIG. 3 illustrates a second embodiment of the web services system 100. As shown in FIG. 3, the web services system 100 further comprises a user data store 350 used by, at least, the web component 160 for the retrieval of user data 355.

User data store 350 may comprise a local database, a remote database, a network database, a distributed database, a combination of these techniques, or any known technique for the storage of data. User data store 350 may store data related to any and every user known to web services system 100. User data store 350 may store data for users with existing user accounts, for users who have been invited to create an account, and for users about which information has been gathered for any other reason. In some embodiments, user data for these various categories may be divided between different databases or between different computing devices, and it will be appreciated that an attempt to retrieve information from the user data store 350 may involve combining checks against different distinct databases.

The request 120 for web page 170 may comprise a request for the entry page of a web services system 100, such as a request for the entry page of a social network. In some embodiments, the entry page may be customized as a login page or a registration page. For example, an entry page for a user who has not yet successfully logged in (either through an explicit login or an implicit login such as through a stored cookie) may contain both a registration area and a login area. A login page may therefore be a login-specific page with a login area and excluding the registration area. A registration page may be a registration-specific page with a registration area and excluding the login area. In some cases, a login page may still contain or allow access to a registration area, but may visually prioritize the login area. In some cases, a registration page may still contain or allow access to a login area, but may visually prioritize the registration area.

The data component 150 may receive the packet 130-1 and extract the phone number 115. The web component 160 may then perform one or more lookups in the user data store 250 using the phone number 115 to determine what, if any, user data 355 is known about a user 105 associated with the phone number 115. For instance, the web component 160 may determine that the phone number 115 is associated with an existing user account for the user 105. Alternatively, the web component 160 may determine that the phone number 115 is not associated with any existing user account. The web component 160 may determine that a phone number 115 not associated with any existing user account is associated with an invitation set to a person on behalf of another user of the website, wherein information about the person received as part of creating the information is stored in the user data store 350 for later user in creating a customized entry page.

The web component 160 may be operative to customize an entry page as a login page based on a determination that the phone number 115 is associated with an existing user account for the website, the customized web page including prefilled login information for the existing user account. The determination that the phone number 115 is associated with an existing user account may be determined according to one or more lookups using the user data store 350 by the web component 160. The user data 355 retrieved from the user data store 350 may include an indication that the phone number 115 is associated with an existing user account, indicating to the web component 160 that it should customize the entry page as a prefilled login page. The login page may include a field for a user to enter one of the one or more unique identifiers associated with them, and the prefilling of the login information may comprise the field for the unique identifier being prefilled with the phone number 115. The login page may, however, allow the phone number 115 to be replaced by a different phone number, such as where the phone 110 is being used by a different individual than the primary individual with which the phone number 115 and existing user account are associated.

The web component 160 may be operative to customize the entry page as a custom registration page based on a determination that the phone number 115 is associated with an invitation sent to a person on behalf of another user of the website, the custom registration page prefilled based on information about the person received as part of creating the invitation. The determination that the phone number 115 is associated with an invitation may be determined according to one or more lookups using the user data store 350 by the web component 160. The user data 355 retrieved from the user data store 350 may include an indication that the phone number 115 is associated with the invitation, indicating to the web component 160 that it should customize the entry page as a prefilled registration page. The registration page may include one or more fields for use in entering information requested or required by the website for the creation of a user account. The user data 355 retrieved from the user data store 350 based on the invitation may be used to prefill one or more of these fields. As with the prefilled login page, these prefilled registration forms may have their prefilled content replaced with different information entered by the user 105 of the phone 110. The phone number 115, which may also be included within user data 355, may be used to prefill a phone number field on the registration page.

A custom registration page may also include additional information, customized according to the phone number and/or user data 355, not used in the creation of a user account. For example, the user data 355 may be used to encourage the user 105 to sign up for a user account, such as by offering personalized incentives for making use of the web services offered by the web service system 100. For example, where the website provided by the web services system 100 is for a social network, the user 105 may be encouraged to complete registration by being shown people they may know on the social network. Where the registration page is customized based on an invitation, the existing user which sent the invitation may be included in the section of people that the new user may know. Other friends of the inviting user may also be displayed, on the possibility that the new user may also know these people. Further information, such as may be based on a social network graph or other gathered information about a user may be used to determine additional people that the new user may know and these additional people may be displayed.

Figure 4:
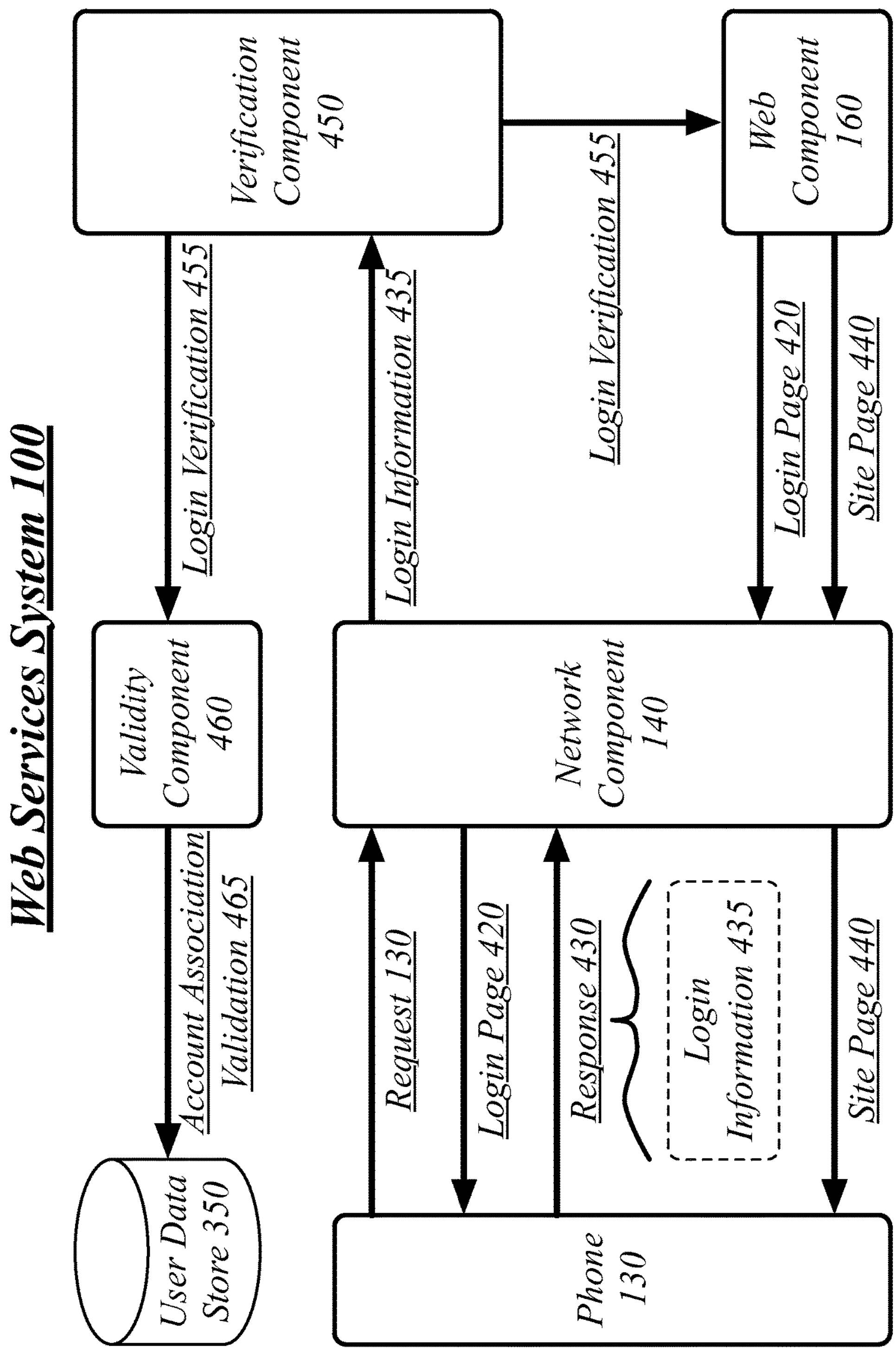
FIG. 4 illustrates a third embodiment of the system to leverage data from mobile headers including a validity component.

FIG. 4 illustrates a third embodiment of the web services system 100. As shown in FIG. 4, the web services system 100 includes a verification component 450 and validity component 460.

The network component 140 and phone 110 may engage in a request-and-response exchange in an attempt to log a user into the web services system 100. The phone 110 may submit the request 120 for a web page 170 to the network component 140. The network component 140 may receive a login page 420 from the web component 160 and transmit the login page 420 to the phone 110. The phone 110 may respond to the login page 420 with response 430, which may comprise login information 435, the login information 435 including both a unique identifier (e.g. account name, e-mail address, phone number) and a password. The network component 140 may forward the login information 435 to a verification component 450 for verification.

The web services system 100 may comprise a verification component 450. The verification component 450 may receive the login information 435 and verify it according to any of the known techniques for password verification. For instance, the verification component 450 may consult a user account table and verify the unique identifier and password against it. It will be appreciated that techniques such as hashing may be used with password verification to protect the security of stored passwords. The verification component 450 may check the unique identifier and password combination and determine whether it verify the login and to allow access to the user account. If the identifier and password combination are verified as correct, the verification component 450 may forward a login verification 455 to the web component 160 to indicate that a site page 440 should be generated and sent to the network component 140 for transmission to the phone 110.

The site page 440 may comprise a front page, a user-specific front page, a user home page, or other entry point into the website reserved for logged-in users. For example, for a social networking service, site page 440 may comprise a user homepage, including a news feed, for the social network. This site page 440 may be customized for the user 105 and may contain content specific to the user 105 or otherwise tailored specifically to the user 105.

In some embodiments, the unique identifier from the login information 435 may be forwarded to the web component 160 prior to the verification of the login. This may allow the web component 160 to prepare the site page 440 specific to the user account in advance of receiving login verification 455. The web component 160 may be operative to prepare and cache the site page 440 in response to receiving the unique identifier in advance of receiving the login verification 455 and to wait to forward the login page 420 to the network component 140 until the login verification 455 has been received. The web component 160 may be operative to eject the prepared site page 440 from the cache if the verification component 450 indicates that the login was not verified and may be operative to eject the prepared site page 440 after a waiting period has lapsed.

The web services system 100 may comprise a validity component 460 operative to extend a validity period for an association between the phone number 115 and the existing user account based on the received correct login information 435. Each or some of the user accounts, such as those stored in user data store 350, may have associated with them a distinct phone number. These phone numbers may be used for additional purposes beyond as unique identifiers for allowing users to log in. For example, users may have one or more phone numbers displayed as part of their contact information visible to other users. Users may be found, such as when searching for friends on a social network, based on their phone number. Further, the web services system 100 may use the phone number to contact the user, such as through telephonic voice communication or through short message service (SMS) messages, such as where a social network attempts to contact a user to communicate news, an alert, an update, social networking information, a request, a person-to-person message, etc.

As phone numbers are generally controlled by an authority external to the web services system 100 (i.e. telecommunications carriers) users may change their phone numbers, receive a new phone number, lose their old phone number, or otherwise enter into a new situation where the existing phone number associated with their content should no longer be associated. Further, because of this external control over phone numbers, the web services system 100 may be not directly involved in this change in phone number and may not automatically receive notice of it or be notified of the change by users. As such, it may benefit the security of web services system 100 for its users if phone numbers are periodically verified as still possessing a valid association with their currently-associated users. Because phone numbers are typically only recycled (assigned to a new user) after a delay, this check may only have to be performed at the same or a faster frequency than the recycling frequency for a telecommunications carrier. In some embodiments, this may comprise asking a user to verify that a phone number currently associated with the is still assigned to them by their carrier and should remain associated with them.

However, correct login information (including a correct password) being received from a phone 110 with the phone number 115 associated with the user account may serve as an implicit indication that the phone number 115 is still in use by the user 105. As compared to where the phone number 115 is merely used as a unique identifier, the phone number 115 is specifically indicated by the carrier 210 as being responsible for sending the request 120 and the receipt of the correct password indicates that the user 105 is on the phone 110. A user may use a prefilled phone number that is no longer in use, or may user their old phone number for logging in, and as such the use of a phone number 115 as a unique identifier may not be sufficient to verify that the user 105 still should be associated with the phone number 115. A user actually using the phone 110 with the phone number 115 serves as a stronger proof of continuing use and as such may be sufficient for the purposes of confirming the continuing validity of associating the phone number 115 with the user account for user 105.

As such, the verification component 450, upon verifying the login information 435, may forward the login verification 455 to the validity component 460 as well as the web component 160. The verification component 450 may be operative to specifically only forward the login verification 455 where the phone number 115 is not only used as a the unique identifier but where the phone number 115 is received as part of at least one of the headers of the packets 130-*a* as inserted by the telecommunications carrier 210. The validity component 460 may be operative to extend the validity period for the association between the phone number 115 and the existing user account based on the received correct login information as verified by the verification component 450. The validity component 460 may be operative to only extend the validity period for the association between the phone number 115 and the existing user account based on the received correct login information where the phone number 115 is received as part of at least one of the headers of the packets 130-*a* as inserted by the telecommunications carrier 210. It will be appreciated that the phone number 115 does not need to be used as the unique identifier in the login information 435 for the validity to be extended. To the contrary, so long as the existing user account with which the phone number 115 is associated is correct logged in (potentially by using another unique identifier associated with the user account) and at least one of the headers of the packets 130-*a* contains the phone number 115 the validity period may be extended.

Figure 5:
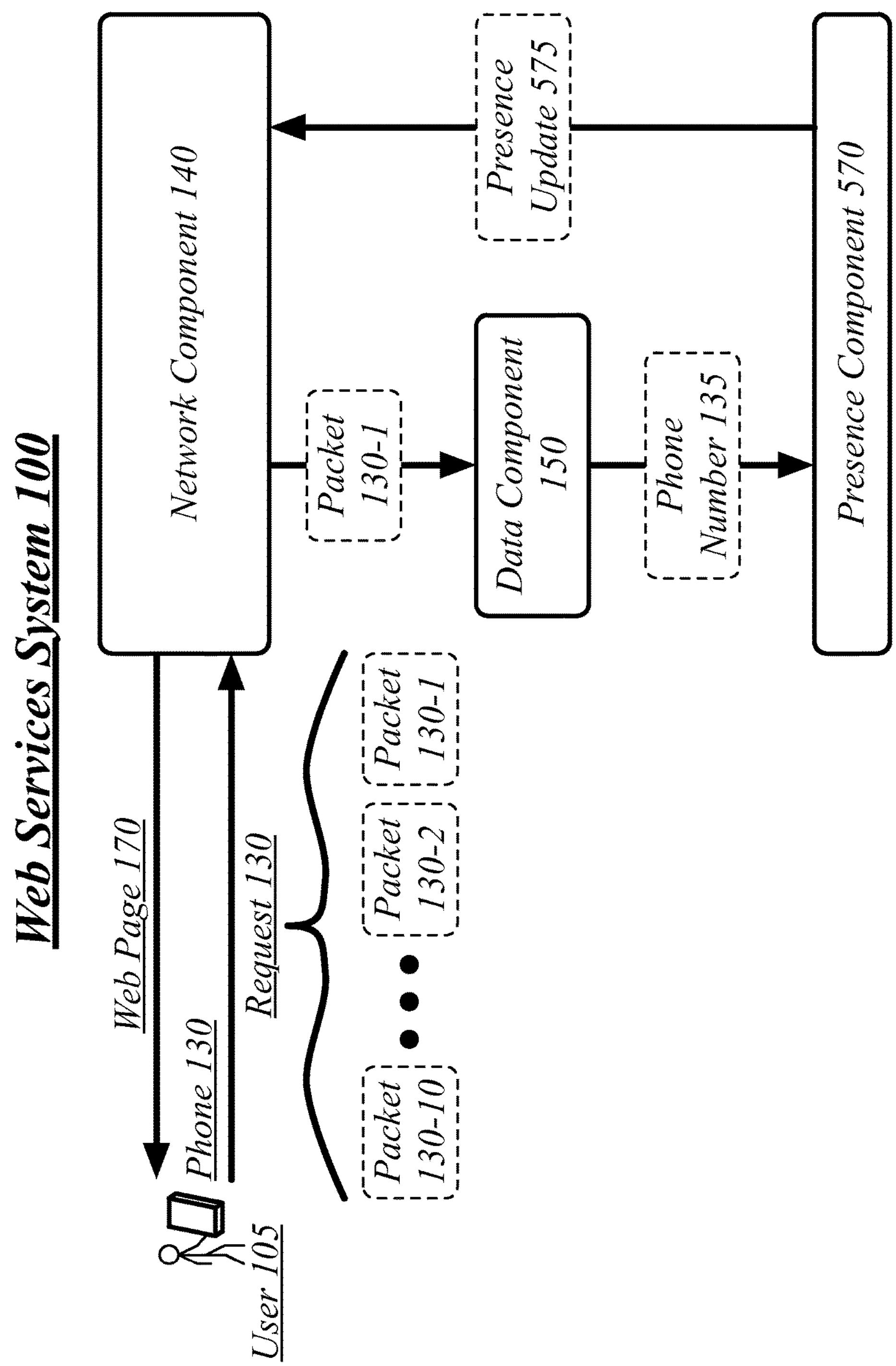
FIG. 5 illustrates a fourth embodiment of the system to leverage data from mobile headers including a presence component.

FIG. 5 illustrates a fourth embodiment of the web services system 100. As shown in FIG. 5, the web service system 100 comprises a presence component 570.

The web services system 100 may maintain a list, table, or other registry of which users of the web services system 100 are currently present and available for communication. In various embodiments, a user may considered to be present if they are currently on the web site or if they are believed to be present on a device to which the web services system 100 may send messages. The web services system 100 may maintain this list of present users in order to enhance communication between users. For example, a user may be able to see which, if any, of their friends on a social networking service are current present and available for messaging, chat, etc.

The web services system 100 may therefore comprise a presence component 570. The presence component 570 may be generally operative to maintain a list of which users of the web services system 100 are currently present or believed to be present for immediate, real-time communication. In some embodiments, the presence component 570 may be operative to indicate a user 105 is present after a verified login to the web services system 100. However, in order to expedite the listing of the user is present, in some embodiments the presence component 570 may be operative to indicate that a user account associated with the extracted phone number 115 is present for contact in a messaging system based on the extracted phone number 115 prior to the user account being logged in. The presence component 570 may also be operative to indicate that the user account is not present for contact in the messaging system if an unsuccessful login is attempted or if a successful login is not performed within a predefined period of time. In some embodiments, a distinct symbol for presence may be used in the interim period between where the phone number 115 is received in a header 230-1 and where a successful login is performed, such as to indicate uncertainty as to whether the successful login will be received and therefore the uncertainty as to whether the user is about to truly be available for messaging.

Figure 6:
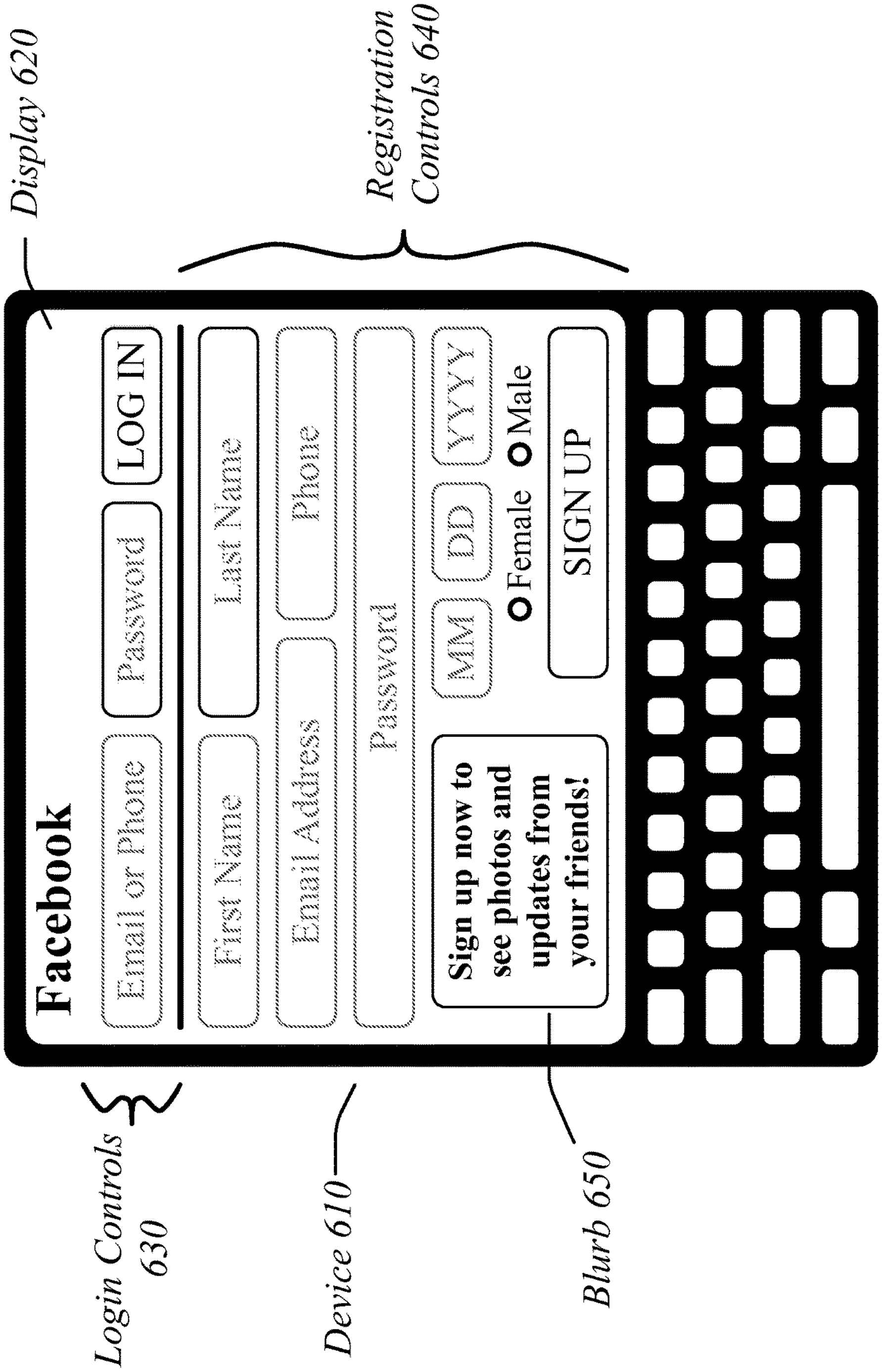
FIG. 6 illustrates an embodiment of a device interacting with the web services system displaying a combined login-and-registration entry page.

FIG. 6 illustrates an embodiment of a device 610 interacting with the web services system 100 displaying a combined login-and-registration entry page.

A device 610 may run a mobile web browser, which may be a first-party web browser included with device 610 or may be a third-party web browser installed by the user after purchase, which may display web pages on display 620. Device 610 may correspond to phone 110 owned by user 105 and assigned phone number 115.

FIG. 6 depicts a scenario in which the web services system 110 has received a request 120 for a web page 170 but has not identified user 105 as originating the request and has not customized the web page 170 for the user. As such, the displayed web page 170 is a combined login-and-registration page allowing for either login or registration, and web page 170 contains no prefilled information specific to user 105. The displayed web page 170 include login control 630 with an "Email or Phone" field for receiving a unique identifier and a "Password" field for receiving a password and a "LOG IN" button to submit the login information.

The displayed web page 170 also includes registration controls 640 including a plurality of fields for the registration of a new user of the web services system 100: "First Name," "Last Name," "Email Address," "Phone," "Password," a trio of date fields "MM", "DD", and "YYYY" (for two-digit month, two-digit day, and four-digit year) for the user's birthday, radio boxes for "Male" and "Female" with a "SIGN UP" button for submitting the registration information. The web page 170 also includes a blurb 650, adjacent to the registration controls 640, encouraging the user to sign up for the service.

The joint login-and-registration page may be displayed where no phone number of other user-specific identifier is received as part of the request 120. Alternatively and additionally, the joint login-and-registration page may be displayed where a received identifier (such as phone number) does not match to any user in the user data store 350.

Figure 7:
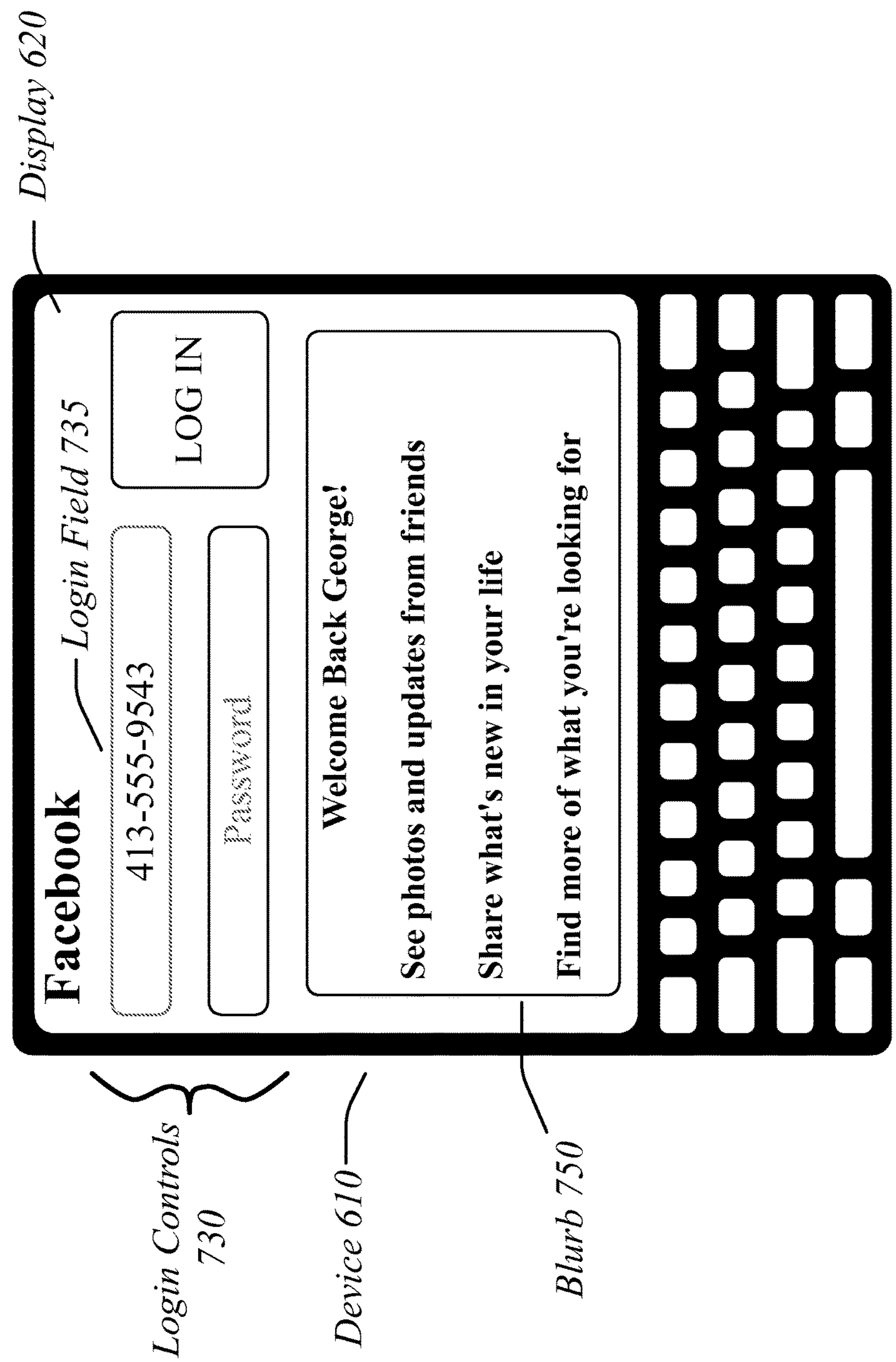
FIG. 7 illustrates a second embodiment of a device interacting with the web services system displaying a login-specific entry page.

FIG. 7 illustrates a second embodiment of a device 610 interacting with the web services system 100 displaying a login-specific entry page.

As shown in FIG. 7, the login-specific entry page displayed includes the login controls 730 with the same fields as the login controls 630 on the joint login-and-registration page of FIG. 6, here shown larger for use by the user 105. However, the login field 735 here has been customized for user 105 by prefilling the phone number 115 (here "412-555-9543") associated with user 105 and received in header 230-1 of packet 130-1 of the request 120. As such, the user 105 is relieved of filling the phone number 115 into the login field 735 and may instead make use of the prefilled phone number 115. The user 105 may therefore log into web services system 100 by entering their password and hitting the "LOG IN" button without having to enter a unique identifier such as phone number 115. As, in some cases, a different user than user 105 may make use of the phone belonging to or otherwise associated with user 105, the entry in login field 735 may be replaced by the current user of the phone, making login field 735 a true field that is merely prefilled, rather than a static entry that the user cannot change.

The login-specific entry page has been further customized for user 105 in blurb 750. The user 105, here "George," has their name listed in the blurb 750 to make the blurb 750 more welcoming and has a message specific to welcoming the user 105 back and the benefits they will receive logging in again, as compared to blurb 650 prompting the user to sign up for the service. As such, the web component 160 may be operative to customize a web page 170 sent to a phone 110 of a user 105 that customizes the web page 170 to make the web page 170 more welcoming or otherwise personalized in addition to the prefilling of forms such as the login field 735 for the login controls 730. The web component 160 may be operative to customize the descriptive text, explanative text, welcome text, or other non-form text to be specific to a user 105 or specific to user 105 being known as an existing user in response to receiving phone number 115 in a header 230-1.

Figure 8:
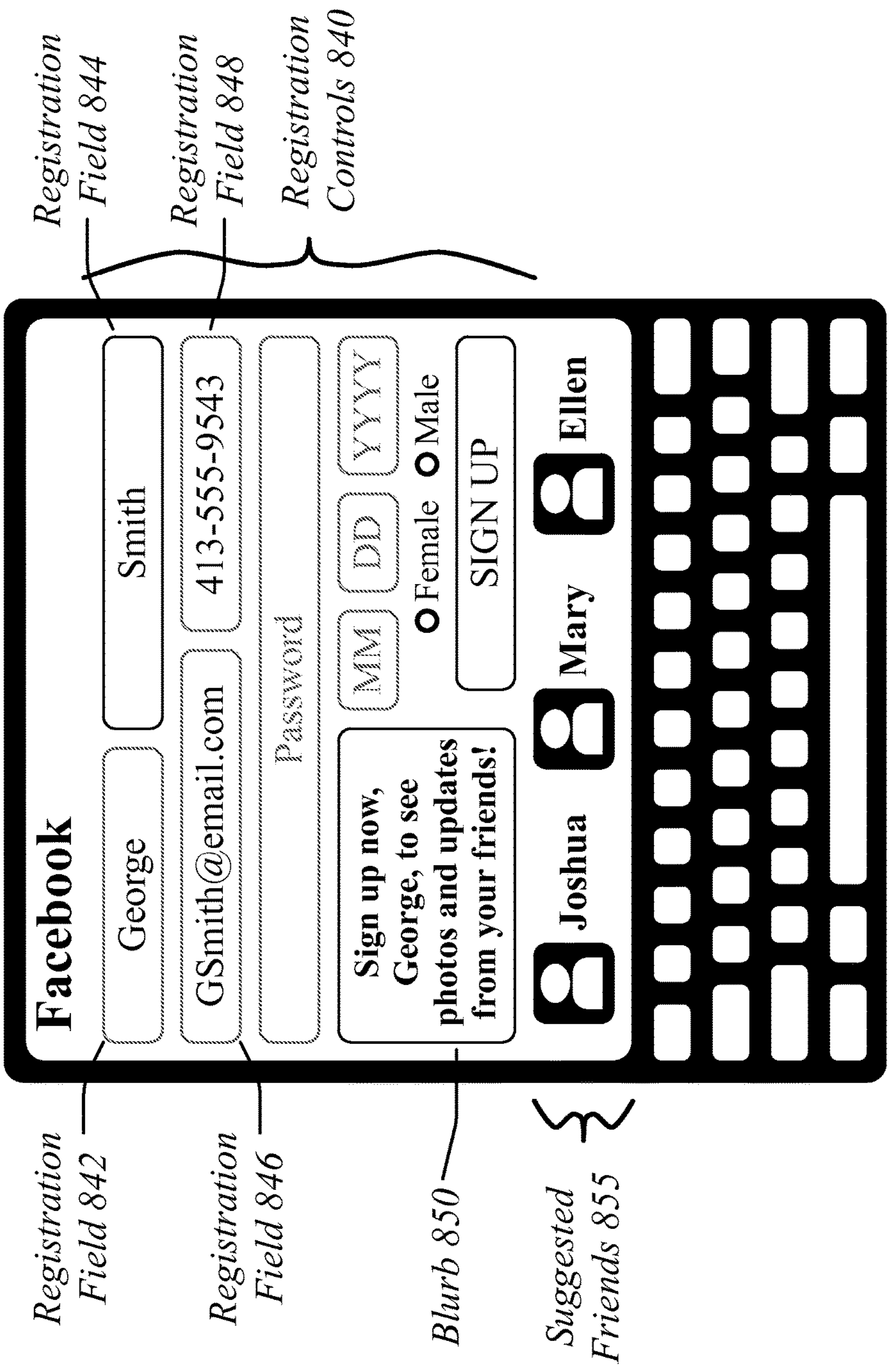
FIG. 8 illustrates a third embodiment of a device interacting with the web services system displaying a registration-specific entry page.

FIG. 8 illustrates a third embodiment of a device 610 interacting with the web services system 100 displaying a registration-specific entry page.

As shown in FIG. 8, the registration-specific entry page displayed includes the registration controls 840 with the same fields as the registration controls 640 on the joint login-and-registration page of FIG. 6, here shown larger for use by the user 105. Further, a number of the fields of the registration controls 840 have been prefilled for user 105: registration field 842 contains their first name "George," registration field 844 with their last name "Smith," registration field 846 with their email address "GSmith@email.com," registration field 848 with their phone number 115 "412-555-9543." Registration fields 842, 844, and 846 were prefilled according to user data 355 retrieved from user data store 350, the user data 355 comprising a first name, last name, e-mail address, and phone number 115 submitted by another user of web services system 100 as part of composing an invitation to user 105 to the website. It will be appreciated that as the phone number 115 was both received as part of header 230-1 from request 120 and was stored in the user data store 350 to be matched against the phone number 115 retrieved from header 230-1 that registration field 848 may be said to have been prefilled according to either the extraction from header 230-1 or according to the retrieval from user data store 350.

As such, the user 105 is relieved of filling one or more of the registration fields in registration controls 840 and may instead make use of the prefilled entries. The user 105 may therefore complete registration with web services system 100 be entering whatever information required by the registration controls 840 was left not prefilled. In the illustrated example, only the password, date-of-birth, and gender fields have been left for the user 105 to complete. It will be appreciated that, in some cases, additional fields may exist in registration controls 840 that the web services system 100 require for registration. Similarly, in some cases some of the prefilled fields in the example of FIG. 8 may not be used in an invitation, may not be available for use in an invitation, or may only be optional in an invitation and unused in specific cases, and as such those fields would be filled by the user 105 in registering as well. As, in some cases, a different user than user 105 may make use of the phone belonging to or otherwise associated with user 105, or, alternatively, the phone number 115 may have changed ownership between the sending of the invitation and reception of request 120, any of the fields of registration controls 840 may be modified and replaced by the current user of the phone, making these fields true fields that are merely prefilled, rather than merely static entries on the web page 170 that the user cannot change.

The registration-specific entry page has been further customized for user 105 in blurb 850. The user 105, here "George," has their name listed in the blurb 850 to make the blurb 850 more welcoming and inviting to the user 105 to complete the registration. As such, the web component 160 may be operative to customize a web page 170 sent to a phone 110 of a user 105 that customizes the web page 170 to make the web page 170 more welcoming or otherwise personalized in addition to the prefilling of forms such as the registration fields 842, 844, 846, and 848 for the registration controls 840. The web component 160 may be operative to customize the descriptive text, explanative text, welcome text, or other non-form text to be specific to a user 105 or specific to user 105 being known as an existing user in response to receiving phone number 115 in a header 230-1.

In some cases, the customization may provide a preview of services, features, or other functionality that will be provided to user 105 after registration. For example, the web services system 100 may be part of a social networking service on which a user 105 may register friends, receive updates other news update their friends, and generally maintain contact with their friends. As such, a web page 170 customized for a user 105 may include a preview of services tailored specifically to user 105. In the illustrated example of FIG. 8, this includes suggested friends 855, listing three people that user 105 may know "Joshua," "Mary," and "Ellen" each shown next to the current user profile photo for each of the suggested friends. In some cases, one of the suggested friends 855 may be user who sent the invitation to the user 105, the web services system 100 implying that a user sending an invitation to another user 105 would do so to one of their friends. The additional friends of suggested friends 855 may consist of existing friends of the inviting user who user 105 may know. The friends of suggested friends 855 may generally comprise any friend that the web services system 100 is able to determine—according to any of the known social networking techniques—may be known to user 105. In some embodiments, in addition to or in alternative to suggested friends 855, the customized web page 170 may include suggested interests, suggested groups, suggested favorites, or other suggested associations that may be made on a social network.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
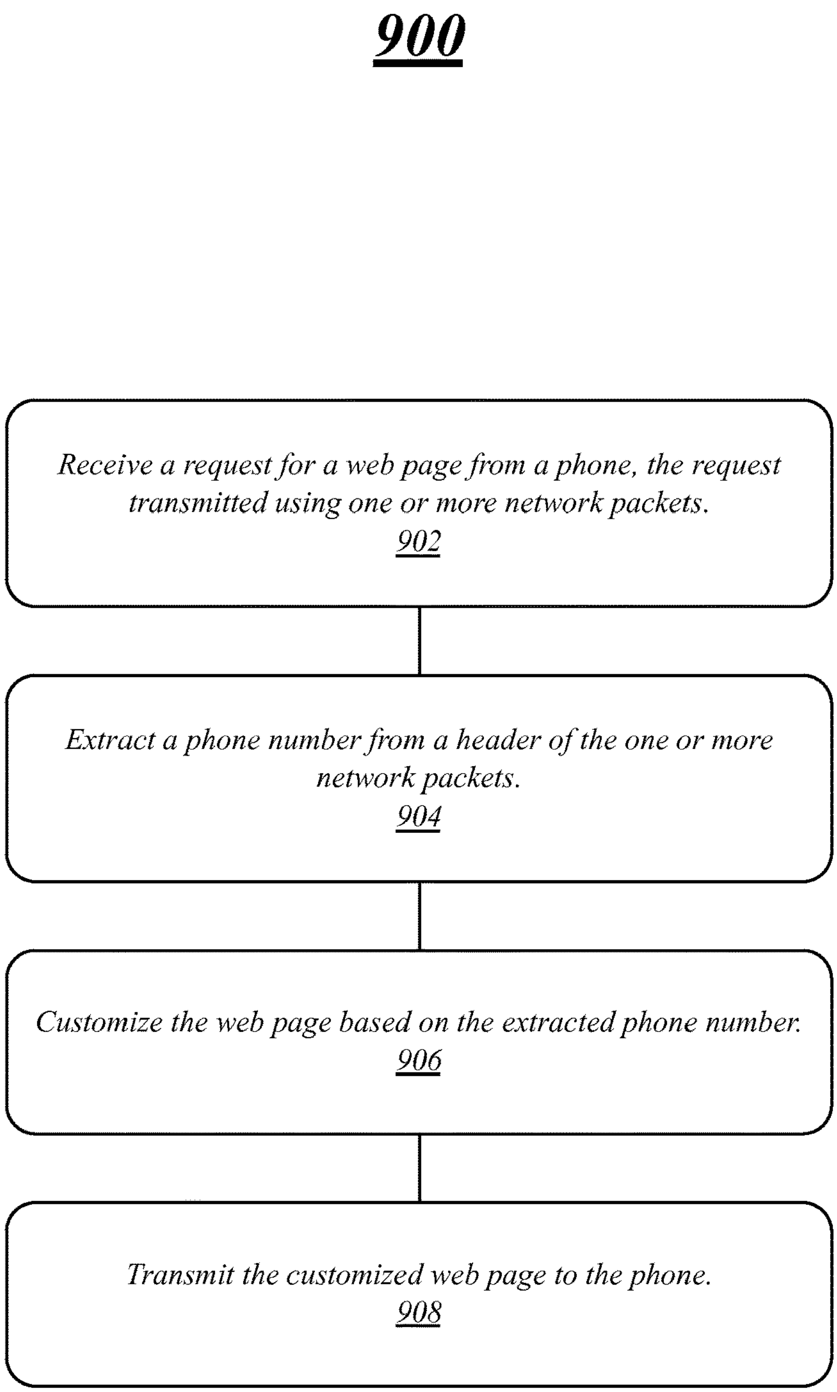
FIG. 9 illustrates an embodiment of a logic flow for the system of FIG. 1.

FIG. 9 illustrates one embodiment of a logic flow 900. The logic flow 900 may be representative of some or all of the operations executed by one or more embodiments described herein.

In the illustrated embodiment shown in FIG. 9, the logic flow 900 may Receive a request 120 for a web page 170 from a phone 110, the request 120 transmitted using one or more network packets **130-*a* at block 902. For example, the request 120 may comprise a request for an entry page for a website provided by web services system 100**.

The request 120 may be transmitted to a destination address comprising one of a plurality of addresses for the web services system 100. The destination address may comprise one of an IP address for the web services system 100 or a domain-name based address for the web services system 100. A telecommunications carrier 210 carrying the request 120 may be operative to examine the destination address, determine that it matches a list of flagged addresses, and in response to this determination insert the phone number 115 into a header 230-1 for a network packet 130-1 of the network packets **130-*a* jointly containing the request 120**.

The logic flow 900 may extract a phone number 115 from a header 230-1 of the one or more network packets **130-*a* at block 904. For example, this phone number 115 may have been inserted into header 230-1 by the telecommunications carrier 210 carrying the request 120 for at least a portion of the trip from the phone 110 to the web services system 110**.

The logic flow 900 may customize the web page 170 based on the extracted phone number 115 at block 906. For example, the requested web page 170 may comprise an entry page for a website, with the entry page customized as a login page or a registration page based on the extracted phone number 115. The entry page may be customized as a login page based on a determination that the phone number 115 is associated with an existing user account for the website, the customized web page including prefilled login information for the existing user account. The entry page may be customized as a registration page based on a determination that the phone number 115 is not associated with any existing user account for the website.

In some cases, it may be determined that the phone number 115 is associated with an invitation sent to a person, such as user 105, on behalf of a user of the website. This invitation may have been received from the other user of the website in a web form provided by the web services system 100 comprising one or more invitation fields that the other user fills with information about the person to be invited. This information may be used to prefill the registration page so as to further customize the web page for the invited person. This registration page may be further customized with people that the invited person may know as determined based on the user who invited the person to the website.

Where the extracted phone number 115 is associated with an existing user account, that existing user account may be indicated as being present for contact in a messaging system based on the extracted phone number 115 prior to the user account being logged in. This may serve to make the user 105 present in the messaging system earlier in the process and therefore invite their friends to contact them as early as possible.

Where the web services system 100 maintains a limited validity period for a method of contact, such as phone number 115, the use by a user 105 of the associated phone 110 to submit correct contact information may be used to extend the validity period As such, the logic flow 900 may receive a response 430 from the phone 110 to the login page, the response 430 comprising correct login information 435 for the existing user account, and extend a validity period for the association between the phone number 115 and the existing user account based on the received correct login information 435.

The logic flow 900 may transmit the customized web page 170 to the phone 110 at block 908. The transmission of the customized web page 170 may make use of the same carrier 210 for at least a portion of the trip to the phone 110 as was used for at least some portion of the trip of the request 120 from the phone 110 to the web services system 100.

The embodiments are not limited to this example.

Figure 10:
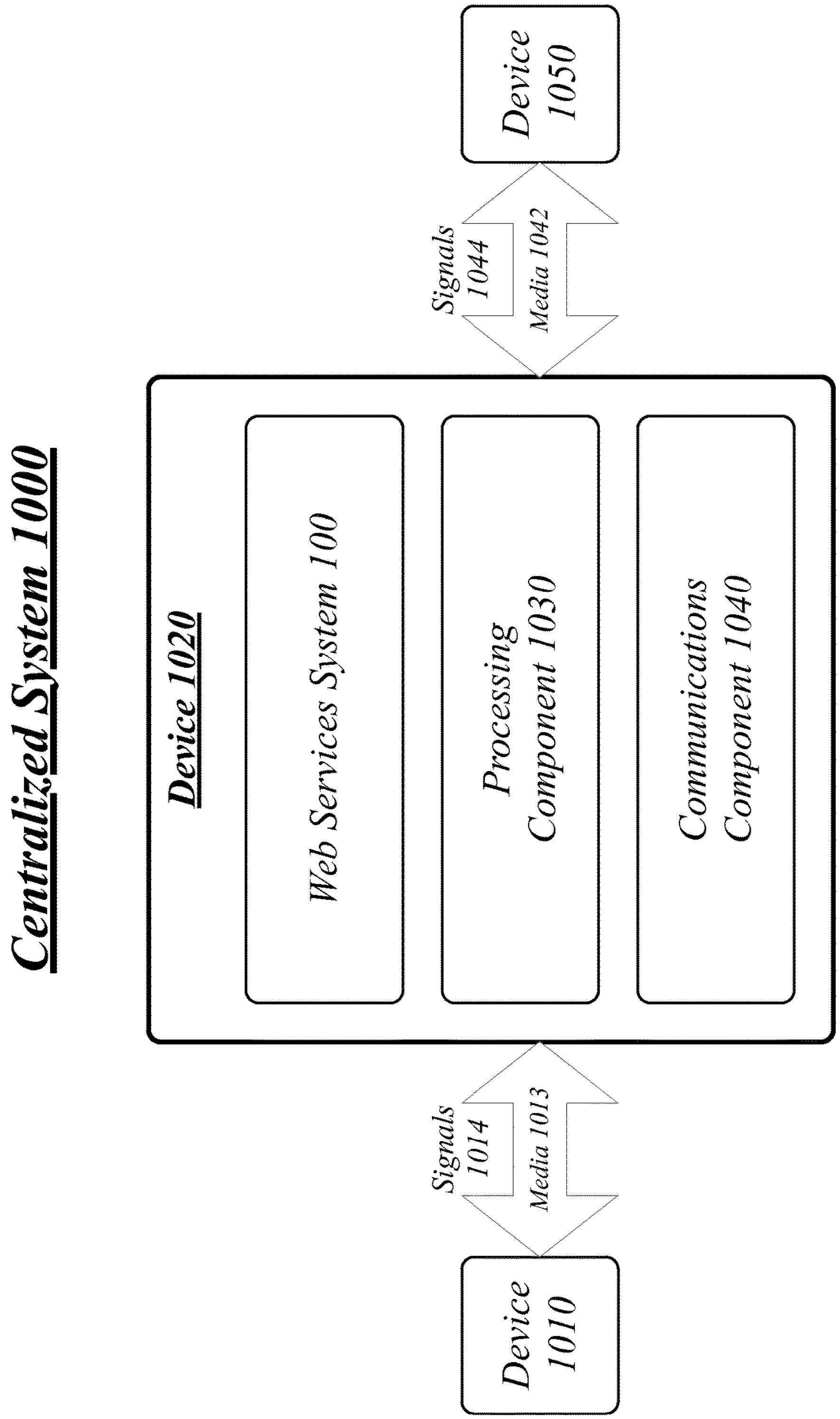
FIG. 10 illustrates an embodiment of a centralized system for the system of FIG. 1.

FIG. 10 illustrates a block diagram of a centralized system 1000. The centralized system 1000 may implement some or all of the structure and/or operations for the web services system 100 in a single computing entity, such as entirely within a single device 1020.

The device 1020 may comprise any electronic device capable of receiving, processing, and sending information for the web services system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1020 may execute processing operations or logic for the web services system 100 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1020 may execute communications operations or logic for the web services system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012, 1042 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1020 may communicate with other devices 1010, 1050 over a communications media 1012, 1042, respectively, using communications signals 1014, 1044, respectively, via the communications component 1040. The devices 1010, 1050 may be internal or external to the device 1020 as desired for a given implementation.

For example, device 1010 may correspond to phone 110 used by user 105. Signals 1014 sent over media 1013 may therefore comprise communication between the phone 110 and the web services system 100 in which the phone 110 transmits a request 120 and receives a customized web page 170 in response. At least a portion of signals 1014 may therefore comprise network packets 130-*a*, at least one of which has a header, such as header 230-1, containing phone number 115. As, in some embodiments, phone number 115 may be inserted by a telecommunications carrier 210, media 1013 may correspond, at least in part, to media maintained and owned by the telecommunications carrier 210. In some cases, signals 1014 sent over media 1013 may comprise the reception of login page 420 by the phone 110, the transmission of response 430 comprising login information 435 from the phone 110 to the web services system 100, and the transmission of site page 440 from the web services system 100 to the phone 110.

Device 1050 may correspond to a second user device 1050 used by a different user from the first user 105. In one embodiment, 1050 may submit information to the web services system 100 using signals 1044 sent over media 1042 to construct an invitation to the first user 105 to join the services offered by web services system 100. For example, if web services system 100 comprises a social networking service, the information sent as signals 1044 may include a name and contact information for the first user 105, the contact information including phone number 115 used later by the web services system 100 to recognize an incoming request 120 from the user 105. In other embodiments, device 1050 may correspond to a device used by a different user that is a friend of the first user 105 on a social networking service, the signals 1044 including status information, news, images, or other social-networking information that is eventually transmitted to device 1010 for viewing by the first user 105 as part of the social networking functionality of the web services system 100.

Figure 11:
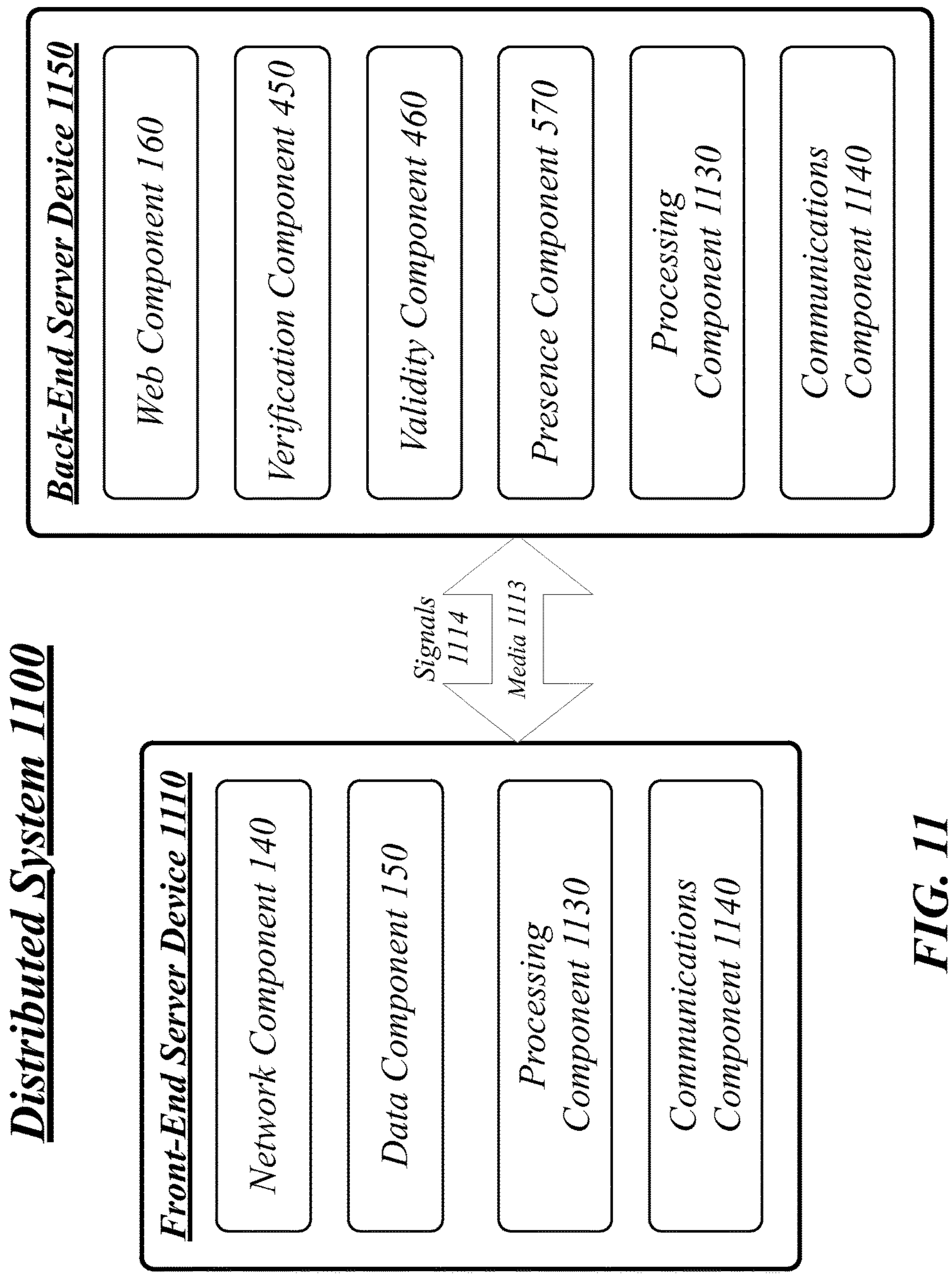
FIG. 11 illustrates an embodiment of a distributed system for the system of FIG. 1.

FIG. 11 illustrates a block diagram of a distributed system 1100. The distributed system 1100 may distribute portions of the structure and/or operations for the web services system 100 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a front-end server device 1110 and a back-end server device 1150. In general, the front-end service device 1110 and the back-end server device 1150 may be the same or similar to the client device 1020 as described with reference to FIG. 10. For instance, the front-end server system 1110 and the back-end server system 1150 may each comprise a processing component 1130 and a communications component 1140 which are the same or similar to the processing component 1030 and the communications component 1040, respectively, as described with reference to FIG. 10. In another example, the devices 1110, 1150 may communicate over a communications media 1112 using communications signals 1114 via the communications components 1140.

The front-end server device 1110 may comprise or employ one or more client programs that operate to perform various methodologies in accordance with the described embodiments. In one embodiment, for example, the front-end server device 1110 may implement the network component 140 and data component 150. The network component 140 and the data component 150 both interact directly with network packets, such as packets 130-*a*, and therefore may benefit from being hosted on the same machine.

The back-end server device 1150 may comprise or employ one or more server programs that operate to perform various methodologies in accordance with the described embodiments. In one embodiment, for example, the back-end server device 1150 may implement the web component 160, the verification component 450, the validity component 460, and the presence component 570. As none of these components interacts directly with network packets, the web services system 100 may benefit from placing these components on a separate back-end service device 1150—which may be unreachable directly via the Internet from outside the local network of the web services system 100—where their processes do not compete for computing resources with the processes of the front-end server device 1110.

As such, the signals 1114 sent over media 1113 may comprise the transmission of information received over the Internet from various client devices from the front-end service device 1110 to the back-end service device. For example, the request 120 may be received from the phone 110 at the front-end service device 1110, the phone number 115 extracted from at least one of the headers of the packets 130-*a*, and the request 120 forwarded without all of the header information to the back-end service device 1150 along with the extracted phone number 115. Based on the request 120 and the extracted phone number 115 the back-end service device 1150 may produce web page 170 and transmit the web page 170 to the front-end service device for transmission to the phone 110.

It will be appreciated that both the front-end service device 1110 and the back-end service device 1150 may be replicated so as to allow greater, parallel processing of incoming requests either or both on the front end and the back end. As such, media 1113 may comprise a shared medium between multiple front-end server devices and back-end server devices, wherein incoming requests are received by one of the multiple front-end server devices, distributed to one of the back-end server devices for processing, and then responded to by one of the front-end server device when one of the back-end server devices has created the responding web page 170.

Figure 12:
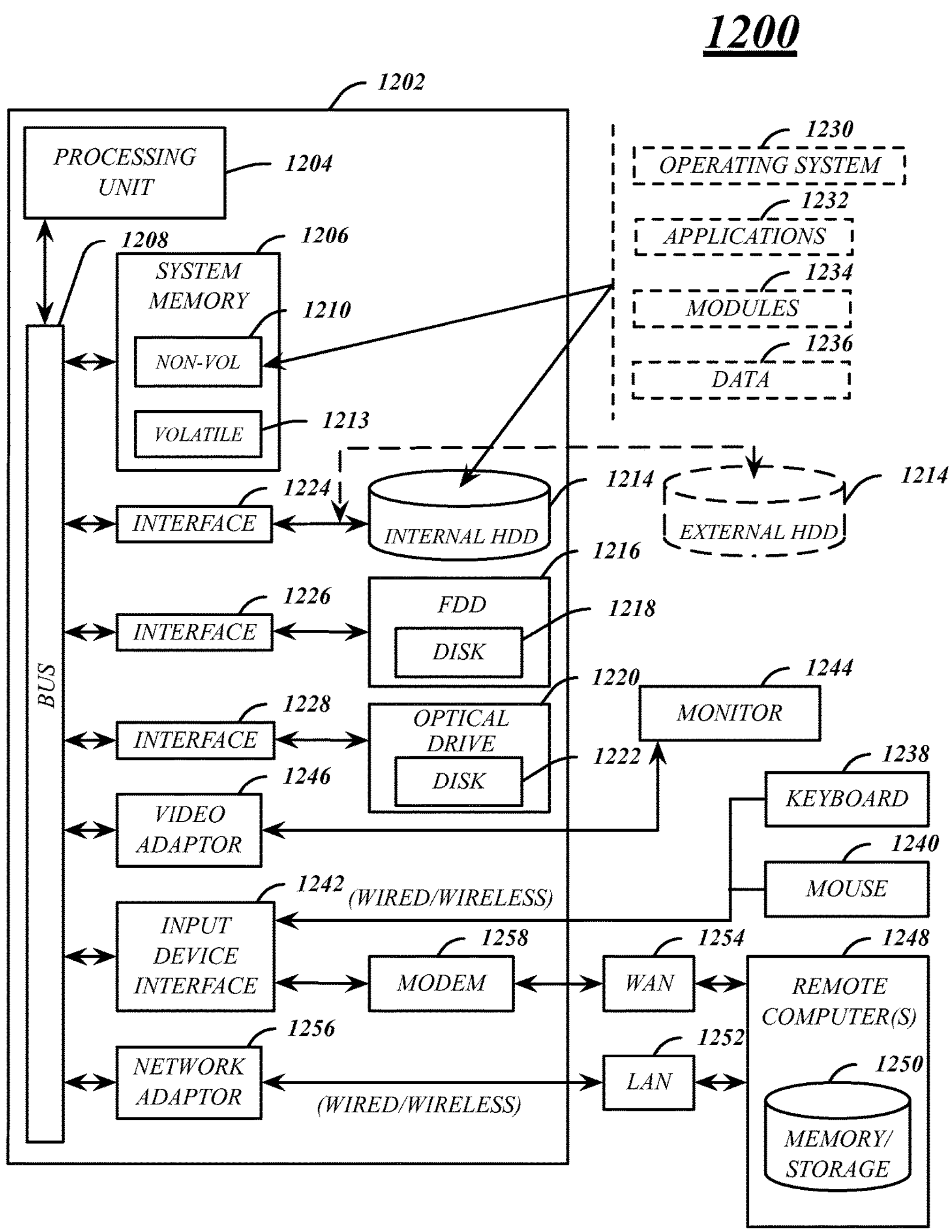
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the web services system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.12 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.12x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
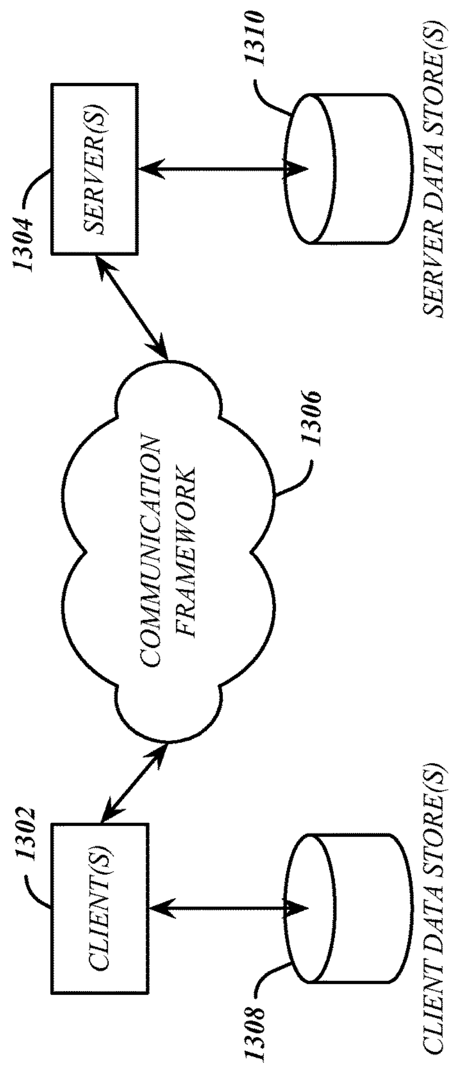
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement the client device 910. The servers 1304 may implement the server device 950. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:

receiving, at a server, a request for a web page from a phone, the request transmitted using one or more network data packets, the requested web page associated with a website;

extracting a phone number from a header of the one or more network data packets;

determining whether the phone number is associated with an invitation and whether the phone number is associated with an existing user account for the website;

in response to determining that the phone number is associated with an invitation and is not associated with an existing user account for the website:

retrieving user data associated with the phone number;

customizing the requested web page based on the extracted phone number to form a custom web page comprising a registration area having a form prefilled with the retrieved user data and a login area, wherein the registration area is visually prioritized with respect to the login area; and transmitting the custom web page to the phone.

2. The method of claim 1, the request transmitted to a destination address, the phone number inserted into the header by a telecommunications carrier in response to a determination that the destination address matches a list of flagged addresses, before the receiving.

3. The method of claim 1, the requested web page an entry page for the website, the entry page customized as a login page with a visually prioritized login area or a registration page with a visually prioritized registration area based on the extracted phone number when the extracted phone number is not associated with an invitation.

4. The method of claim 3, comprising:

customizing the entry page as the login page based on a determination that the phone number is associated with an existing user account for the website, the customized entry page including prefilled login information for the existing user account.

5. The method of claim 4, comprising:

receiving a response from the phone to the login page, the response comprising correct login information for the existing user account; and extending a validity period for the association between the phone number and the existing user account based on the received correct login information.

6. The method of claim 3, comprising:

customizing the entry page as the registration page based on a determination that the phone number is not associated with any existing user account for the website.

7. The method of claim 1, comprising:

determining other user accounts based on a user account that issued the invitation;

including information about the determined other user accounts in the registration page.

8. The method of claim 1, comprising:

indicating that a user account associated with the extracted phone number is present for contact in a messaging system based on the extracted phone number prior to the user account being logged in.

9. An apparatus, comprising:

a processor circuit on a server device;

a network component configured to execute on the processor circuit to:

receive a request for a web page from a phone, the request transmitted using one or more network data packets; and transmit the web page to the phone, the requested web page associated with a website;

a data component configured to:

execute on the processor circuit to extract a phone number from a header of the one or more network data packets; and a web component configured to execute on the processor circuit to:

determine whether the phone number is associated with an invitation and whether the phone number is associated with an existing user account for the website;

in response to determining that the phone number is associated with an invitation and is not associated with an existing user account for the website:

retrieve user data associated with the phone number; and customize the web page based on the extracted phone number as a custom web page comprising a registration area having a form prefilled with the retrieved user data and a login area;

wherein the registration area is visually prioritized with respect to the login area.

10. The apparatus of claim 9, the request transmitted to a destination address, the phone number inserted into the header by a telecommunications carrier in response to a determination that the destination address matches a list of flagged addresses, before the receiving.

11. The apparatus of claim 9, the requested web page an entry page for the website, further comprising:

wherein the web component customizes the entry page as a login page with a visually prioritized login area based on a determination that the phone number is associated with an existing user account for the website, the customized entry page including prefilled login information for the existing user account;

wherein the network component receives a response from the phone to the login page, the response comprising correct login information for the existing user account; and a validity component configured to execute on the processor circuit to extend a validity period for the association between the phone number and the existing user account based on the received correct login information.

12. The apparatus of claim 9, wherein the web component includes information about other user accounts based on a user account that issued the invitation in the custom registration page.

13. The apparatus of claim 9, further comprising:

a presence component configured to execute on the processor circuit to indicate that a user account associated with the extracted phone number is present for contact in a messaging system based on the extracted phone number prior to the user account being logged in.

14. A non-transitory computer-readable storage medium comprising instructions that, when executed, cause a system to:

receive a request, at a server, for a web page from a phone, the request transmitted using one or more network data packets, the requested web page associated with a website;

extract a phone number from a header of the one or more network data packets;

determine whether the phone number is associated with an invitation and whether the phone number is associated with an existing user account for the website;

in response to determining that the phone number is associated with an invitation and is not associated with an existing user account for the website:

retrieve user data associated with the phone number;

customize the web page as a custom web page comprising a registration area having a form prefilled with the retrieved user data and a login area, wherein the registration area is visually prioritized with respect to the login area; and transmit the custom web page to the phone.

15. The non-transitory computer-readable storage medium of claim 14, the request transmitted to a destination address, the phone number inserted into the header by a telecommunications carrier in response to a determination that the destination address matches a list of flagged addresses, before the receiving.

16. The non-transitory computer-readable storage medium of claim 14, the requested web page an entry page for the website, comprising further instructions that, when executed, cause a system to:

customize the entry page as a login page with a visually prioritized login area based on a determination that the phone number is associated with an existing user account for the website, the customized entry page including prefilled login information for the existing user account;

receive a response from the phone to the login page, the response comprising correct login information for the existing user account; and extend a validity period for the association between the phone number and the existing user account based on the received correct login information.

17. The non-transitory computer-readable storage medium of claim 14, comprising further instructions that, when executed, cause a system to:

indicate that a user account associated with the extracted phone number is present for contact in a messaging system based on the extracted phone number prior to the user account being logged in.

* * * * *